Oct. 4, 1966   C. L. WHITEFORD   3,277,224
METHOD OF THERMOFORMING
Filed April 5, 1963
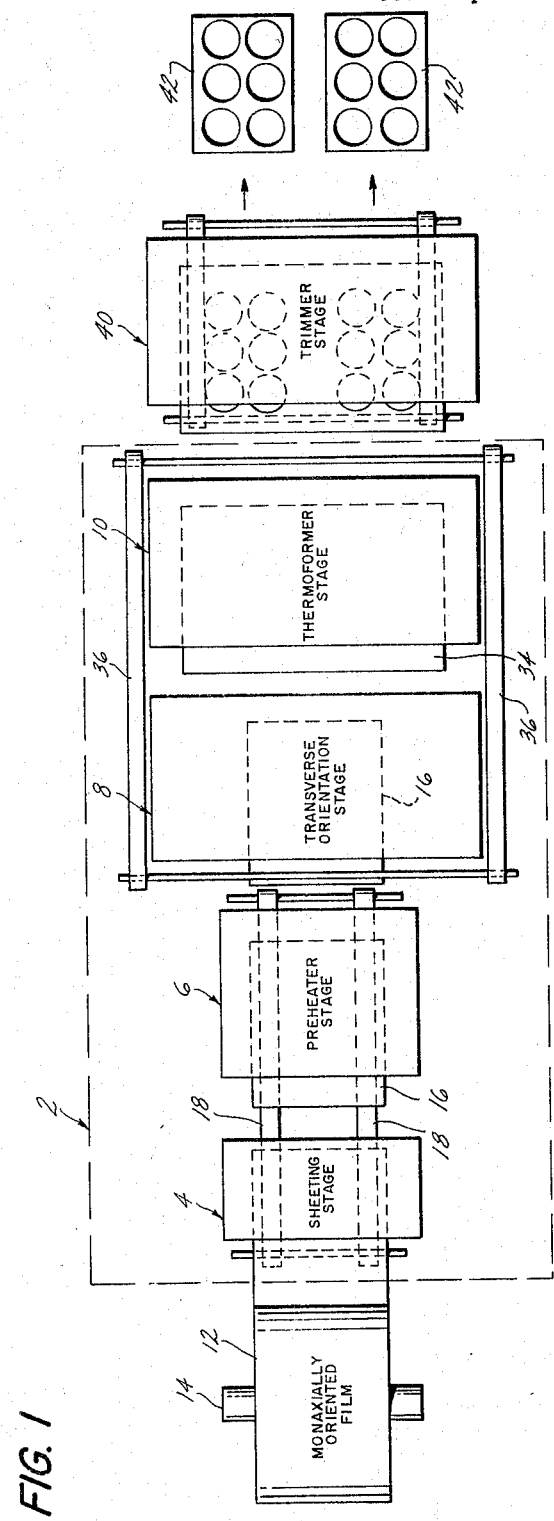
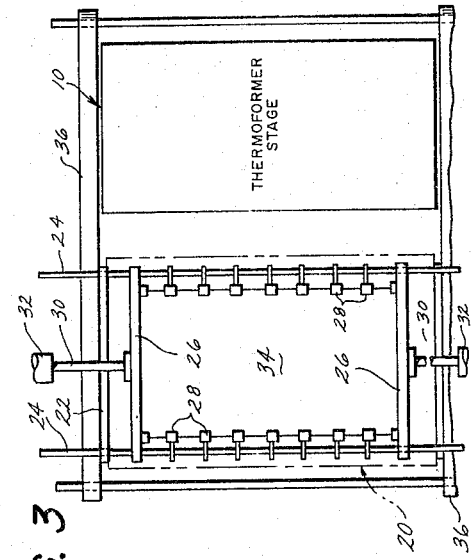
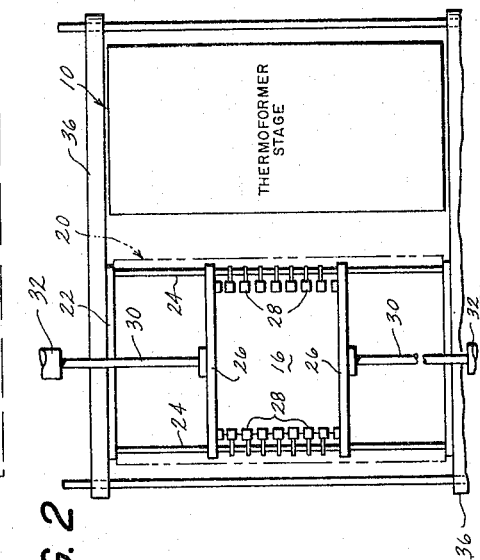
INVENTOR.
CARLTON L. WHITEFORD
BY
Peter L. Costas
ATTORNEY United States Patent Office 3,277,224
Patented Oct. 4, 1966

3,277,224
METHOD OF THERMOFORMING
Carlton L. Whiteford, New Canaan, Conn., assignor to Poly-Pak Corporation of America, Springdale, Conn., a corporation of Delaware
Filed Apr. 5, 1963, Ser. No. 270,891
14 Claims. (Cl. 264—160)

The present invention relates to fabricating articles of biaxially oriented synthetic plastic sheet material and more particularly to a method of thermoforming articles of biaxially oriented synthetic plastic sheet material from monaxially oriented synthetic plastic sheet material, and to the apparatus therefor.

Biaxially oriented synthetic thermoplastics such as polystyrene and polypropylene are widely employed in the production of relatively low-cost thermoformed articles, particularly in the packaging field. Efforts to supplant paperboard in packaging more widely have met with considerable resistance due to the cost differential between the two types of material, and efforts to reduce further the cost of biaxially oriented polystyrene have been largely unsuccessful due to the costs and problems of control in the most prevalent processes of biaxial orientation, the tenting technique being the most widely employed.

It is an object of the present invention to provide a method for economically fabricating articles of biaxially oriented polystyrene sheet material.

Another object is to provide such a method wherein monaxially oriented polystyrene sheet material is converted to biaxially oriented polystyrene sheet material and thereafter is thermoformed into a product by a series of steps which may be rapidly effected and substantially governed by the period for the thermoforming cycle.

Still another object is to provide such a method wherein energy is economically and efficiently utilized to biaxially orient and thermoform monaxially oriented polystyrene sheet material.

A further object is to provide relatively economical and effective apparatus for fabricating articles of biaxially oriented synthetic plastic from monaxially oriented synthetic thermoplastic sheet material.

Other objects and advantages will be apparent from the following detailed description and claims and the attached drawings wherein:

FIGURE 1 is a schematic representation of the operational stages of an apparatus embodying the method of the present invention for fabricating an article of biaxially oriented synthetic plastic from a strip of monaxially oriented synthetic plastic sheet material;

FIGURE 2 is a more detailed view of the orientation and thermoforming stages of the apparatus of FIGURE 1 and showing a generalized schematic plan view of the transverse orientation assembly with a stretching frame assembly having a length of synthetic plastic sheet material engaged therein prior to transverse orientation; and FIGURE 3 is a generalized plan view of the assembly and frame assembly of FIGURE 2 after the sheet material has been stretched to effect transverse orientation.

It has been found that the foregoing and related objects can be attained by a method of fabricating an article of biaxially oriented synthetic plastic sheet material from monaxially oriented synthetic plastic sheet material comprising introducing heat substantially uniformly into a length of synthetic plastic sheet material which has been preoriented in the longitudinal direction and which is substantially unoriented in the transverse direction while substantially preventing any loss of orientation in the longitudinal direction. The preheated length of synthetic plastic sheet material is then stretched in the transverse direction sufficiently to effect substantial molecular orientation in the transverse direction and to produce biaxial orientation of the length of synthetic plastic sheet material. Thereafter, the biaxially oriented length of synthetic plastic sheet material is thermoformed while maintaining a portion of the heat previously introduced thereinto to produce an article of biaxially oriented synthetic plastic sheet material.

For most applications, additional heat will be introduced into the biaxially oriented sheet material to raise the temperature still further and facilitate thermoforming. The preheating of the length of sheet material may be accomplished in one or a plurality of steps dependent upon the nature of the thermoplastic material and the time sequences of operation. Although the length of sheet material may be an unsevered portion of a large roll or long strip, the length is preferably severed to provide a generally rectangular portion which may be easily handled and stretched.

According to a simplified and highly efficient aspect of the invention, a sheeter assembly cuts a length or rectangular portion from a roll of synthetic plastic material which has been preoriented in the longitudinal direction. This rectangular length may be conveyed to a preheating stage wherein its temperature is uniformly elevated to facilitate transverse stretching, or the length may be severed in conjunction with the preheating stage either prior or subsequent to preheating. In order to prevent any substantial disorientation on the longitudinal direction, the temperature to which the sheet material is preheated desirably is below the temperature at which orientation in the longitudinal direction was effected, although higher temperatures may be used if the sheet material is secured against disorientation stresses in the longitudinal direction such as by securing the transverse edges of the severed length. For some applications, it may be desirable to employ a plurality of preheating stages to raise the temperature to the desired point.

The severed length of preheated synthetic plastic sheet material is introduced into a transverse orientation stage wherein it is rapidly stretched in a transverse direction from about two to five times the original transverse dimension for effecting a substantial transverse molecular orientation and, accordingly, biaxial orientation of the sheet material is obtained. At this stage, it is desirable to restrain the transverse edges of the sheet against longitudinal contraction during the transverse stretching, although the marginal areas wherein such contraction occurs in unrestrained sheet material may be treated as scrap areas in the subsequent thermoforming step.

The resulting biaxially oriented synthetic plastic sheet material is then introduced into a thermoforming stage wherein it is secured about its periphery against disorientation stresses and wherein its temperature generally is further elevated to well above the disorientation temperature. The synthetic plastic sheet material is then deformed into close surface contact with a suitably configured mold by air pressure and by mechanical means in combination therewith on occasion. After the thermoformed sheet has set by contact with the mold, it is removed from the mold and trimmed to produce a finished article of biaxially oriented synthetic thermoplastic material.

Since the question of speed of operation is important to economical utilization of the method of the present invention, it is most desirably conducted within integrated apparatus to prevent loss of heat and the stages operate in timed sequence, each governed by the time for thermoforming so as to move the sheet material rapidly therethrough for optimum production rates. The apparatus may move the sheet material therethrough in a horizontal plane or in a generally vertical plane to reduce space requirements.

Referring now in detail to the attached drawings, FIGURE 1 schematically illustrates the steps of a method embodying the present invention as constituted by stages within apparatus outlined in broken line and generally designated by the numeral 2. Included in the apparatus 2 are a sheeter stage or assembly generally designated by the numeral 4, a preheating stage or assembly generally designated by the numeral 6, a transverse orientation stage or assembly generally designated by the numeral 8, and a thermoforming stage or assembly generally designated by the numeral 10.

A roll 12 of synthetic thermoplastic sheet material such as polystyrene which has been preoriented in the longitudinal direction is rotatably mounted upon a shaft 14 adjacent the sheeter end of the apparatus 2, and the sheet material is fed from the roll 12 into the sheeter stage 4 wherein it is cut into substantially rectangular portions 16 of predetermined length.

A first pair of conveyor belts 18 carry the portion 16 from the sheeter stage 4 to the preheating stage 6 wherein heat is uniformly introduced thereto to raise the temperature for facile stretching (a single-stage unit has been shown for simplicity of illustration). The conveyor belts 18 then advance the preheated portion 16 into the transverse orientation stage 8 and deposit it upon a stretching frame assembly for stretching the sheet material in the transverse direction such as shown in FIGURES 2 and 3. The frame is generally designated by the numeral 20 and includes a pair of longitudinal bars 22 and transverse rods 24. A pair of elongated clamps 26 grip the longitudinal edges of the portion 16 and are slidably mounted at their ends on the transverse rods 24. A plurality of relatively narrow jaws 28 are slidably mounted on each of the transverse rods 24 and grip the transverse edges of the portion 16 to prevent the contraction of the transverse edges thereof as the result of the stretching in the transverse direction. The elongated clamps 26 are coupled by the connecting rods 30 to associated power means 32 such as hydraulic motors for imparting controlled movement thereto in the direction transversely of the sheet and the resulting stretching of the sheet material. When the portion 16 is deposited in the frame assembly 20, the elongated clamps 26 close securely upon the longitudinal edges and the jaws 28 close upon the transverse edges of the portion 16, conveniently by use of electromagnetically latched and unlatched elements so as to operate the clamps and jaws upon electrical impulses.

After the jaws 28 and elongated clamps 26 have gripped the portion 16, the connecting rods 30 pull the clamps 26 outwardly in the transverse direction of the sheet material, preferably in a smooth but rapid manner, so as to stretch the portion 16 to the position shown in FIGURE 3 and produce a blank of sheet material 34 which is biaxially oriented. The jaws 28 slide transversely of the sheet on the rods 30 as the transverse edges of the portion 16 of sheet material are stretched outwardly, thus preventing longitudinal contraction of the transverse edges. As the elongated clamps 30 produce the desired degree of stretch under action of the power means 32, they are locked into position by mechanical fasteners (not shown) on the longitudinal bars 22 and the connecting rods 30 are disengaged therefrom.

The biaxially oriented blank 34 is now substantially secured against disorientation recovery stresses by the clamps 26 and the jaws 28, and a pair of conveyor belts 36 are activated to advance the entire stretching frame assembly 20 which is secured upon the belts 36 to the next stage. Concurrently, another stretching frame assembly (not shown) carried by the belts 36 is moved into the orientation stage and another preheated portion (not shown) carried by the belts 18 is moved into position on the incoming stretching frame assembly.

Thus, the blank 34 is advanced rapidly into the thermoforming stage 10 while maintaining a portion of the heat previously introduced thereinto and then the temperature of the blank 34 is rapidly and uniformly raised therein to a temperature suitable for thermoforming. Air pressure (either positive or negative), occasionally in combination with plungers or other mechanical assistants, forces the blank 34 into close surface contact with a suitably configured mold (not shown). The thermoformed blank 34 rapidly sets in contact with the relatively cool mold face and the conveyor belts 36 are activated to move the frame 20 outwardly from the thermoforming assembly 10 while an electric impulse simultaneously opens the jaws 28 and clamps 26 to free the blank 34 so that it falls onto the conveyor belts 38 which convey it into the trimming stage generally designated by the numeral 40 wherein the thermoformed blank 34 is trimmed and cut into two containers 42.

For optimum operation in the digrammatically illustrated embodiment, a plurality of stretching frame assemblies 20 is mounted on the conveyor belts 36 to support the portion 16 during stretching and to carry the newly stretched blank 34 of biaxially oriented sheet material into the thermoforming stage 10 as the preceding thermoformed blank 34 is conveyed outwardly therefrom and into the trimming stage 40. The stretching frame 20 thus acts to maintain the sheet material in tension from the orientation step through the thermoforming stage without the requirement for clamping the blank after it is moved into the thermoforming stage. This not only raises the production rate to a maximum but minimizes heat loss in the sheet material as it passes from preheating through orientation to thermoforming, thus lowering the per-unit energy requirements of the thermoforming stage 10.

For efficient operation, the several stages of the process are synchronized with the fastest practical operation of the slowest stage. Since the thermoforming process generally is the slowest step and requires a minimum of about three to five seconds per cycle, the step or steps for preheating and the transverse orientation step each must be completed within this time period. Relatively powerful means such as hydraulic engines must be used to accomplish the rapid uniform stretching against the resistance to deformation of the polystyrene at this temperature range.

The advantages of the present invention may be readily appreciated by reference to the formation of polystyrene articles. Typically monaxially oriented polystyrene may be initially oriented in the longitudinal direction at a temperature of about 200 to 250 degrees Fahrenheit and is elongated about 200 to 400 percent by drag rolls or other suitable means to provide an easily formable material. Therefore, the temperature to which the preheating stage raises the polystyrene desirably is below 200 degrees Fahrenheit unless the sheet material is restrained against longitudinal disorientation stresses during preheating. Generally, a preheating temperature of 160 to 190 degrees Fahrenheit is satisfactory, and the polystyrene preferably is stretched transversely about 200 to 400 percent to provide an easily formable biaxially oriented material although greater stretching may be effected if so desired.

In addition to the considerable saving in the time required for raising the blank to temperature in the thermoforming stage, the amount of energy saved in the thermoforming stage by utilizing to a maximum the residual heat energy in the sheet material after preheating and biaxial orientation is quite substantial in view of the fact that the temperature of the sheet material generally is elevated to approximately 300 degrees Fahrenheit in the thermoforming stage prior to application of pressure to effect molding. If a sheet is introduced into the thermoforming stage at a temperature of 180 degrees Fahrenheit instead of at room temperature of about 80 degrees Fahrenheit, it can be seen that a theoretical heat energy saving of approximately 45 percent can be realized in the thermoforming assembly. This savings is not negated by the heat energy requirements of the preheating stage or the energy requirements of the preheating stage or the energy requirements of the transverse orientation stage, the costs of which are considerably less than the price differential between the cost of commercially obtained biaxially oriented sheet material used in conventional thermoforming processes and the cost of the cheaper monaxially oriented sheet material which may be readily produced for use in the present novel and inventive method.

Thus, it can be seen that the present invention provides a novel method for fabricating articles of biaxially oriented synthetic plastic sheet material from monaxially oriented sheet material which is efficient and economical and tends to make articles of biaxially oriented synthetic thermoplastic sheet material more competitive with conventional paperboard in packaging and other applications. The method is readily employed upon various types of orientable thermoplastics under conditions which may be easily determined for optimum operation. The execution of the method does not require prohibitively expensive equipment and the need for expensive control and supervision is obviated by the liberal tolerances permissible in the operating conditions and by the simplicity of operation.

Having thus described the invention, I claim:

1. In the method of fabricating an article of biaxially oriented polystyrene from monaxially oriented polystyrene sheet material, the steps comprising providing a roll of polystyrene sheet material which has been pre-oriented in the longitudinal direction and is substantially unoriented in the transverse direction, said roll being at a temperature below the temperature at which said sheet material was longitudinally oriented; uncoiling and severing a generally rectangular length from said roll of sheet material; introducing heat substantially uniformly into said length of sheet material while substantially preventing loss of orientation in the longitudinal direction; stretching said heated length of sheet material in the transverse direction sufficiently to effect substantial molecular orientation in the transverse direction and thereby to produce biaxial orientation of said length; and thereafter thermoforming said biaxially oriented length of sheet material while maintaining a portion of the heat previously introduced thereinto and gripping the edges thereof to prevent loss of orientation.

2. The method of claim 1 wherein said length of sheet material is heated prior to transverse orientation to a temperature below the temperature of longitudinal orientation of said length to prevent substantial loss of orientation in the longitudinal direction during heating and orientation in the transverse direction.

3. The method of claim 1 wherein said length of sheet material is gripped at its transverse edges during said transverse orientation and prevented from longitudinal contraction.

4. The method of claim 1 wherein the time periods for said transverse stretching and thermoforming steps are substantially equal.

5. The method of claim 1 wherein said preheated rectangular portion is stretched in the transverse direction from two to four times its original transverse dimension.

6. The method of claim 1 wherein said biaxially oriented rectangular portion is heated to a temperature above about 250 degrees Fahrenheit in said thermoforming step.

7. The method of claim 1 wherein said thermoplastic sheet material is maintained in a substantially vertical plane during the several steps.

8. In the method of fabricating an article of biaxially oriented polystyrene from monaxially oriented polystyrene sheet material, the steps comprising providing a roll of polystyrene sheet material which has been pre-oriented in the longitudinal direction and is substantially unoriented in the transverse direction at a temperature which is below the temperature at which said sheet material was longitudinally oriented; uncoiling and severing a generally rectangular length from said roll of sheet material; heating said rectangular length of said synthetic polystyrene sheet material to a temperature below the temperature of longitudinal orientation of said synthetic polystyrene material; grasping each longitudinal edge portion of said heated rectangular length along the length thereof and pulling outwardly on said longitudinal edge portions to stretch said rectangular length in the transverse direction while grasping each transverse edge of said rectangular length to prevent substantially any longitudinal contraction, said stretching being sufficient to effect substantial molecular orientation in the transverse direction and to produce biaxial orientation of said rectangular portion; continuing to grasp the transverse and longitudinal edge portions of said oriented rectangular length to prevent shrinkage and introducing said biaxially oriented rectangular length into a thermoforming assembly while maintaining a substantial portion of the heat previously introduced thereinto; heating said rectangular length to a higher temperature for thermoforming while maintaining a substantial portion of the heat previously introduced thereinto and continuing to grasp the edge portions to prevent disorientation; and applying pressure to said heated length between said edge portions to form it into an article of biaxially oriented synthetic polystyrene.

9. In the method of fabricating an article of biaxially oriented polystyrene material from monaxially oriented polystyrene sheet material, the steps comprising providing apparatus having stations for preheating, transversely stretching, and thermoforming synthetic thermoplastic sheet material, providing a roll of polystyrene sheet material which has been pre-oriented in the longitudinal direction at a temperature below the temperature at which said sheet material was longitudinally oriented and is substantially unoriented in the transverse direction; uncoiling said roll of sheet material and severing a generally rectangular length therefrom; introducing said rectangular length into said preheating station; introducing heat substantially uniformly into said length while substantially preventing loss of orientation in the longitudinal direction; advancing said heated length to said transverse stretching station; stretching said heated length in the transverse direction sufficiently to effect substantial molecular orientation in the transverse direction and to produce biaxial orientation of said length; advancing said biaxially oriented length to the thermoforming stage while maintaining a substantial portion of the heat previously introduced thereinto; and thermoforming said length into an article of biaxially oriented polystyrene while maintaining a substantial portion of the heat previously introduced thereinto and gripping the edge portions thereof to prevent substantially disorientation, the time periods for said thermoforming, heating and stretching steps being substantially equal.

10. Apparatus for fabricating an article of biaxially oriented synthetic plastic from monaxially oriented synthetic thermoplastic sheet material comprising roll support means for supporting a roll of synthetic thermoplastic sheet material; means for uncoiling said roll of thermoplastic sheet material and severing a generally rectangular length therefrom; heating means for introducing heat substantially uniformly into a generally rectangular length of synthetic thermoplastic sheet material which is pre-oriented in the longitudinal direction; stretching means for gripping the edge portions of the heated length and stretching the heated length of sheet material in the transverse direction; means for thermoforming the stretched sheet material; and conveying means for transporting the length of sheet material while gripping the edge portions thereof to substantially prevent disorientation between said several means, said conveyor means operating in timed sequence to insure thermoforming of the stretched length while maintaining a portion of heat previously introduced thereinto.

11. The apparatus of claim 10 wherein said stretching means includes means gripping the transverse edges of the sheet material to prevent longitudinal contraction thereof.

12. Apparatus for fabricating an article of biaxially oriented synthetic plastic from monaxially oriented synthetic plastic sheet material comprising a plurality of stages including a sheeting stage having roll support means for supporting a roll of synthetic thermoplastic sheet material and means for uncoiling said roll and severing a generally rectangular length therefrom; a heating stage for heating a rectangular length of synthetic thermoplastic sheet material which is monaxially oriented in the longitudinal direction to a temperature below the temperature of the longitudinal orientation of the synthetic thermoplastic material; a stretching stage including gripping elements for clamping the longitudinal edge portions of the rectangular length along the length thereof and means for pulling outwardly on said longitudinal edge portions to stretch the rectangular portion in the transverse direction, said stretching stage including gripping elements for grasping each transverse edge portion of the rectangular length to prevent substantially any longitudinal contraction; a thermoforming stage for thermoforming the stretched length into an article of the desired configuration including a heater for introducing additional heat into the stretched length and a die and pressure-applying means; means for conveying said length between said several stages, said means transporting the length from said stretching unit to said thermoforming unit with said gripping elements engaged therewith to prevent contraction of the length of sheet material during said transporting and introduction of additional heat; and means for operating said several stages and conveying means in timed sequence to insure thermoforming of the stretched length of sheet material while maintaining a substantial portion of the heat previously introduced thereinto.

13. The apparatus in accordance with claim 12 wherein said operating means effects the operation of said thermoforming, heating and stretching stages simultaneously and in substantially equal time periods.

14. The apparatus in accordance with claim 12 wherein a plurality of preheating stages are provided operating at equal time periods.

References Cited by the Examiner

UNITED STATES PATENTS

| | | | |
|---|---|---|---|
| 3,025,566 | 3/1962 | Kostur | 18—19 |
| 3,059,810 | 10/1962 | Edwards. | |
| 3,082,482 | 3/1963 | Gaunt | 264—289 |

ROBERT F. WHITE, *Primary Examiner.*

M. R. DOWLING, *Assistant Examiner.*